July 18, 1961  R. L. WRIGHT, JR., ET AL  2,993,147
TURBINE ZERO SPEED INDICATOR AND CONTROL CIRCUIT
Filed Aug. 5, 1958
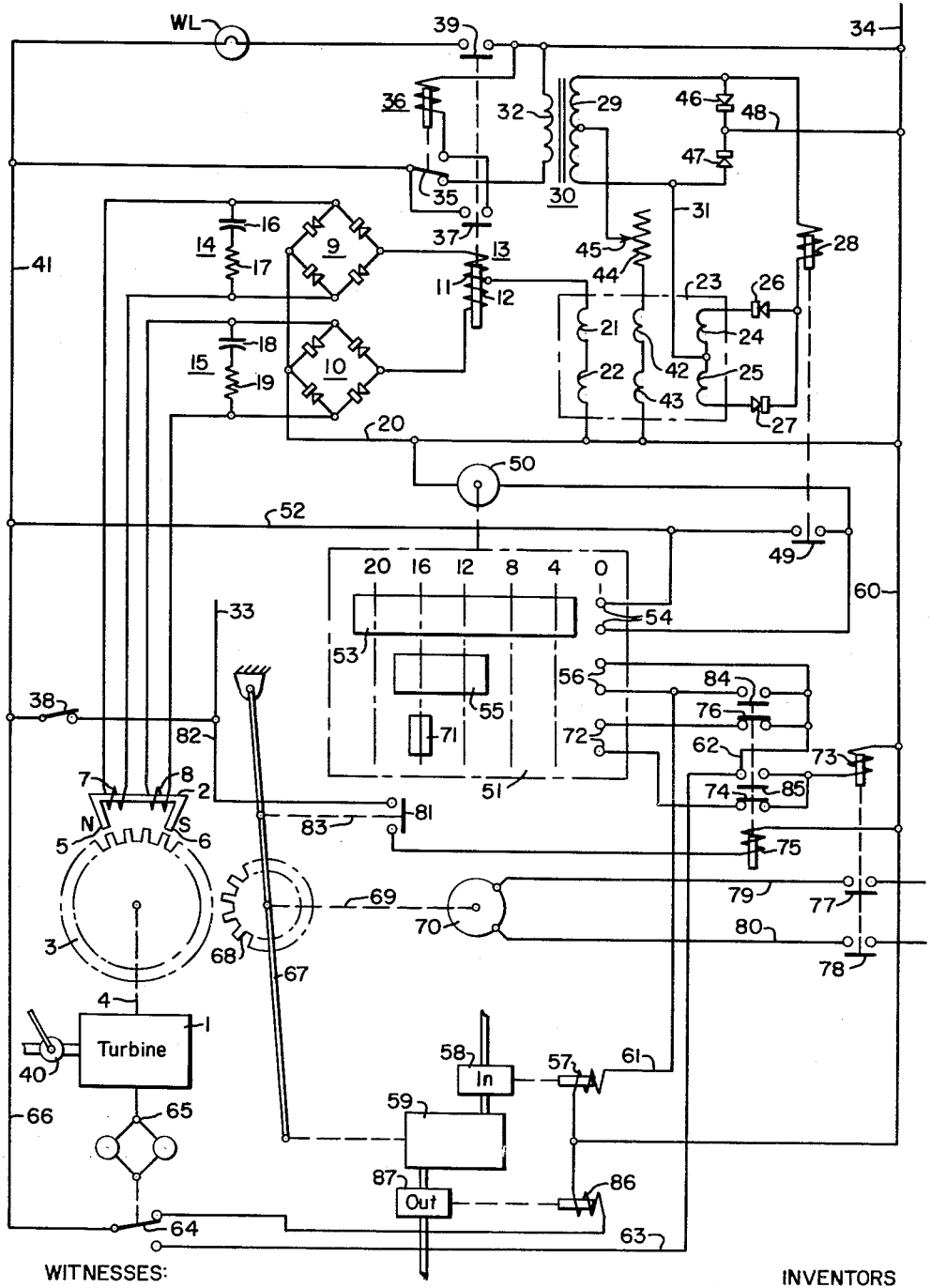
WITNESSES:
Bernard R. Giegver
James F. Young
INVENTORS
Robert L. Wright, Jr. and
Milton P. Vore.
BY
George C. Thompson
ATTORNEY

United States Patent Office 2,993,147
Patented July 18, 1961

2,993,147
TURBINE ZERO SPEED INDICATOR AND CONTROL CIRCUIT
Robert L. Wright, Jr., North Linthicum, and Milton P. Vore, Catonsville, Md., assignors to Westinghouse Electric Corporation, East Pittsburgh, Pa., a corporation of Pennsylvania
Filed Aug. 5, 1958, Ser. No. 753,282
11 Claims. (Cl. 317—21)

This invention relates to a turbine zero speed indicator and control circuit, and more particularly to a device capable of determining the zero speed of a turbine and actuating a turbine turning gear within a few seconds following the zero speed indication.

In the operation of present day steam turbines, particularly where the turbines are driving generators for public utilities, it becomes necessary to occasionally shut down a turbine and remove its generator from the system during low load periods. In order to prevent damage to the turbine due to steam heating the upper portion of the rotating member in the turbine, it is necessary to rotate the turbine at some slow speed to provide even heating of the rotating member. From the time that the turbine comes to rest to the time at which dangerous bending of the rotating member takes place, is a period measured in seconds. The period is found to be dangerous beyond a time period of 30 seconds. It is, therefore, necessary for the operator of the turbine to be constantly alert, to be sure that the driving gear is actuated immediately following the turbine at rest condition, in order to prevent bowing and damage to the rotating member. Since the turbine rotation is for a long period of time following the actual removal of power therefrom, it is always possible for the operator to have his attention diverted to some other operation at the critical time that the turbine comes to rest.

It is, therefore, an object of this invention to provide a circuit capable of detecting the zero speed condition of an associated rotating member.

It is another object of this invention to provide a circuit control by the zero speed detecting device for actuating a driving mechanism for the turbine following the apparatus condition.

It is another object of this invention to provide a circuit for the zero speed indicator capable of indicating failure of the indicator circuit without allowing the turbine to come to rest with the assumption that the circuit is operating properly.

There is another object of this invention to prevent driving gear engagement of the turbine when the rotating speeds of the turbine are in excess of a safe value.

Other objects, purposes and characteristic features will become obvious as the description of the invention progresses.

In practicing this invention, there is provided an inductive pick-up adjacent the bull gear of a turbine or other rotating device capable of detecting a change in flux due to the rotation of the bull gear. This magnetic pick-up in turn controls a magnetic amplifier capable of being actuated in response to a zero or near zero pick-up of the magnetic pick-up to cause a time delay relay to control the engagement of a drive mechanism for the turbine to rotate the turbine at a minimum speed.

The figure of the drawing is a schematic view of one embodiment of this invention showing the zero speed indicator and turbine drive control circuit.

The control circuit for the turbine 1 comprises an inductive pick-up or voltage generator core 2 positioned adjacent a suitable bull gear 3 connected to the shaft 4 of the turbine 1 and having its ends 5 and 6 positioned in close proximity to the teeth of the bull gear 3 and having a span capable of matching exactly with the teeth of the gear in order to be alternately positioned above the teeth of the gear or above the space between the teeth of the gear as the gear rotates. The pick-up comprises a permanent magnetic core 2 which is provided with a pair of pick-up coils 7 and 8 connected through suitable rectifiers 9 and 10, respectively, to coils 11 and 12 wound in opposition to form a control relay 13. The coils 7 and 8 have connected thereacross a pair of filters 14 and 15, respectively. The filter 14 comprises a series connected capacitor 16 and resistor 17. The filter 15 comprises a series connected capacitor 18 and resistor 19. These filters bypass the high frequency current generated at high speeds and prevent excessive voltages.

One terminal of each of the rectifiers 9 and 10 is connected to ground or a common conductor 20 with the other output terminal of each of the rectifiers being connected through the opposing coils 11 and 12 of the relay 13 as previously recited. The coils 11 and 12 of the relay 13 are connected at common end through a pair of control windings 21 and 22 of the magamp 23 to the common conductor 20. It can be seen, therefore, that any current flowing through the rectifiers 9 and 10 and the coils 11 and 12 will pass through the coils 21 and 22 and will provide a signal for controlling the magnetic amplifier 23, the purpose of which will be explained hereinafter.

The magnetic amplifier 23 is provided with a pair of main energizing windings 24 and 25 connected through the rectifiers 26 and 27 and a control relay 28 to one side of a secondary winding 29 of a power supply transformer 30. The other side of the secondary 29 is connected through the conductor 31 to a point midway between the main windings 24 and 25 causing each of the windings 24 and 25 to conduct on opposite half cycles of the input frequency supplied by the transformer 30. The transformer 30 is provided with a primary winding 32 connected across the supply conductors 33 and 34 through the contact 35 of the safety relay 36. The safety relay 36 is energized over a contact 37 of the relay 13 previously described. The circuit for energizing the relay 36 can be traced from the conductor 33 through an On-Off switch 38, the conductor 41, the contact 37, when in its closed position, the relay winding of the relay 36 to the conductor 34. It is to be understood that the relay 36 becomes energized only in response to a malfunction of the pick-up inductor 2 causing an unbalance of current in the windings 11 and 12 of the relay 13. Movement of the armature of the relay 13 in response to a malfunction of the inductor 2 also closes its contact 39 to energize a warning light WL connected between the conductors 41 and 34 by the contact 39.

The magnetic amplifier 23 is provided with a positive bias by the windings 42 and 43, the windings 42 and 43 are series connected between the common conductor 20, connected to the source conductor 34, and a midpoint on the secondary winding 29 of the transformer 30 through a bias adjusting resistor 44 provided with a movable contact 45. The bias windings 42 and 43 are energized by a direct current developed by output from the secondary winding 29 supplying operating current to the rectifiers 46 and 47 which are oppositely poled for providing a full-wave rectification of the supply to the windings 42 and 43. The rectifiers 46 and 47 are series connected across the winding 29, center tapped therebetween, and connected to the common conductor 34 through a conductor 48.

The bias windings 42 and 43, being positively energized by a direct current, normally act to cause conduction of the magnetic amplifier 23. This conduction would occur during all periods of zero rotation of the turbine.

However, during turbine rotation, the voltage developed by the pickup causes a current flow through the control windings 21 and 22 which opposes the positive bias of the windings 42 and 43. During this period, therefore, with the turbine in rotation, the magnetic amplifier is prevented from high current conduction or saturation, and the relay 28 is therefore deenergized.

The relay 28 is provided with a contact 49, as maintained in its opened position during periods of turbine rotation. The contact 49, however, when in its closed position during such periods that the turbine is at rest, completes an energizing circuit for a timing device or motor 50 capable of driving a suitable controller such as having a drum 51 represented in development form in the drawing, for driving gear control to be explained hereinafter. The energizing circuit for the motor 50 can be traced from the conductor 33, through the On-Off switch 38, conductor 52, the contact 49 of the relay 28, the motor 50, and the conductor 20 to the source conductor 34. Energization of the motor 50 causes the controller drum 51 to be displaced to the right as viewed in the drawings, to cause the contact strip 53 to engage the contact points 54 to complete a stick circuit for the motor 50 around the relay contact 49. The motor 50, therefore, remains energized and continues to move the drum to the right and after expiration of a suitable period, such as 10 seconds, causes the engagement of the contact strip 55 with suitable contact points 56. Completion of the circuit for the contact points 56 causes a supply of current to flow through the winding 57 opening the air-in-valve 58 to the fluid pressure motor 59. The energizing circuit for the winding 57 can be traced from the conductor 34, through the conductor 60, the winding 57, conductor 61, contact points 56, now closed, the conductors 62 and 63, a contact member 64, of a governor switch 65, now closed in its bottom or reverse position due to the turbine at rest condition, the conductor 66 and to the source conductor 33.

The governor switch 65 is connected to the shaft 4 of the turbine 1 and is closed in its reversed or bottom position from zero speed to 33 r.p.m. When the 33 r.p.m. level is reached, the governor switch 65 causes the contact member 64 to move to its front or upward position, as viewed in the drawings. The purpose of this governor switch will be explained hereinafter.

Supply of fluid under pressure as a result of energization of solenoid winding 57 actuates the hydraulic motor 59, causes its linkage 67 to engage the drive gear 68 with the bull gear 3. The drive gear 68 is connected through a mechanical linkage 69 to a suitable drive motor such as a synchronous motor 70, the energizing circuit of which will be explained hereinafter.

Continued movement of the controller drum 51 causes the contact strip 71 to engage the contact points 72. Engagement of the contact strip 71 with the contact points 72 completes an energizing circuit for the motor control relay 73 that can be traced from the supply conductor 60, through the control winding 73, the now closed contact member 74 of the now deenergized gear-in relay 75, the contact points 72 now closed, the now closed contact 76 of the gear-in relay, the conductor 63, the governor contact 64 and conductors 66 and 33 to the source. Energization of the motor control relay 73 causes its armature to close the contact members 77 and 78, in the supply conductors 79 and 80 for the drive motor 70.

In order to maintain the drive gear engaged with the bull gear 3 and the motor 70 maintaining rotation of the turbine 1, a pick-up circuit for the gear-in relay 75 is provided through a gear-in contact member 81 now closed with the gears engaged. This circuit can be traced from the supply conductor 33 through the conductor 82, the now closed contact 81, the winding of the gear-in relay 75 to the supply conductors 60 and 34.

The gear-in contact member 81 is mechanically connected to the gear-in linkage 67 through a mechanical link 83 in such a manner as to cause the contact member to be closed during gear mesh periods and open during gear disengagements. The relay 75 now being energized shifts its contact members to close the contacts 84 and 85 for maintaining the air-in-valve 58 in its open position and its motor control relay 73 in the energized condition.

If after a period of time it is desired to bring the turbine up to normal speed with steam being introduced in the turbine through the valve 40, an increase in speed takes place causing the governor 65 to shift its contact members 64 to its upper position in which it is shown in the drawing. In its upper position, contact 64 interrupts the circuit for the relay 73 and the relay 57 for the air-in-valve 58. With these members deenergized, the motor 70 becomes deenergized and the air-in-valve 58 becomes closed. At the same time, an air-out solenoid winding 86 becomes energized causing the air-out-valve 87 to be opened, exhausting the fluid motor 59 and causing the disengagement of the drive gear 68 and the bull gear 3. Movement of the turbine in response to the drive motor 70 or the introduction of steam causes deenergization of the relay 28 conditioning the timing controller drum 51 for movement to the initial starting position. Movement of the controller drum places same in proper position for a new operation with the contact member 49 and the strip 53 opened for deenergizing the motor 50.

A brief description of the operation will now be given. If we assume that the turbine generator is on the line with the turbine operating at normal speed, we can see that the following conditions will exist. Inductor 2 is being energized by movement of the bull gear 3 causing the magnetic amplifier 23 to be in a non-conducting state and the relay 28 to be denergized. At the same time, the governor switch 65 has moved its contact 64 to the upper position causing the air-out-valve to be opened and the fluid motor 59 to maintain the drive gear 68 separated from the bull gear 3. Since the energizing circuit for the air-in-valve and the motor control relay 73 is interrupted by the governor contact 64, it can be seen that these relays remain deenergized. If the operator of the turbine has now decided that the turbine is no longer needed but must be maintained ready for use in the future, the steam valve 40 is closed causing the turbine to decelerate and slowly come to rest. As the turbine slows down, the inductor 2 develops less and less output and at some point, say 2 or 3 r.p.m., in the motion of the gear 3, the windings 21 and 22 cease to oppose the positive bias of the windings 42 and 43 of the magnetic amplifier 23. At this time, the magnetic amplifier becomes active and energizes the relay 28. Energization of the relay 28 in turn closes its contact member 49 and energizes the drum controller motor 50. Movement of the controller drum 51 completes a hold circuit for the motor 50 through its contact strip 53 and, after a time delay, the contact 55 completes an energizing circuit for the air-in-valve winding 57 which now becomes energized over the contacts 64 of the governor switch 65 in its lower position due to the standstill condition of the turbine. The air-in-valve causes the fluid motor 59 to cause the engagement of the gears 68 and 3 and the completion of the circuit via contact 81 for the gear-in relay 75. At the same time, the controller drum driven by the motor 50 has continued its operation or movement until the strip 71 engages the contact points 72. At this time, the relay 73 becomes energized causing the energization of the drive motor 70 for the gear 68. At the same time, the gear-in relay 75 completes a hold circuit for the relay 73 and the air-in-valve 58 over its contacts 84 and 85. This circuit can only be interrupted by an increase in speed of the turbine above the 33 r.p.m. established by the governor switch 65 in controlling its contact member 64. The turbine 1 is, therefore, driven at a desirable speed below the exemplified 33 r.p.m., the speed selected is preferably 30 r.p.m. If the turbine speed is increased to a point above 33 r.p.m., the governor switch 65, through its contact 64, interrupts the energizing control circuit for the drive motor 70 and air-in-valve 58. At the same time, the contact 64 completes a pick-up circuit for the air-out-valve 87 causing the disengagement of the gear 68 from the gear 3.

The safety features of the circuit will now be described in detail. The relay 13 previously described as having the windings 11 and 12 can only be energized if an unbalance exists between the current flow through the windings 11 and 12 of the relay 13. This condition can only exist upon the failure of the coils 7 and 8, inductor 2, the smoothing filter circuits 14 and 15, or the full wave rectifiers 9 and 10. If we assume, for example, a failure occurs in one of the coils 7 or 8 causing an unbalance in the current through the windings 11 and 12, it can be seen that the contact 37 of the relay 13 will become closed, completing an energizing circuit for the relay 36. Energization of the relay 36 causes its contact 35 to interrupt the energized circuit for the magnetic amplifier 23 and to close a stick circuit for the relay 36 maintaining the relay energized. At the same time, the failure is indicated by the warning light WL energized over the now closed contact 39. Deenergization of the magnetic amplifier 23 thus prevents engagement of the drive or turning gear 68 with the bull gear 3, while the turbine is operating at high speed, even though a failure of the pick-up speed detector 2 occurs. In order to reset the circuit, it is only necessary to interrupt the circuit by the On-Off switch 38.

Since numerous changes may be made in the above described construction and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. A rotating member zero speed indicator and drive control comprising a slotted gear member connected to rotate with said rotating member, a voltage generating means adjacent to and inductively cooperating with the teeth of said gear member for generating an alternating voltage according to rotation of said rotating member, an amplifier connected to said voltage generating means and maintained deactivated during voltage generation, a timing means connected to said amplifier for time out operation in response to activation of said amplifier, and drive means connected to said timing means for control energization at the end of said time out operation, said drive means also being selectively connected to said gear member by the operation of said timing means.

2. A rotating member zero speed indicator and drive control comprising a gear member connected to rotate with said rotating member, a voltage generating means adjacent to and inductively cooperating with the teeth of said gear member for generating an alternating voltage according to rotation of said rotating member, an amplifier connected to said voltage generating means and maintained deactivated during voltage generation, a timing means connected to said amplifier for time out operation in response to activation of said amplifier, drive means connected to said timing means for control energization at the end of said time out operation, said drive means also being selectively connected to said gear member by the operation of said timing means, and speed control means for causing deenergization and resetting of said drive and timing means in response to a selected speed of said rotating member.

3. A rotating member zero speed indicator and drive control comprising a gear member connected to rotate with said rotating member, a voltage generating means adjacent to and inductively cooperating with the teeth of said gear member for generating an alternating voltage according to rotation of said rotating member, an amplifier connected to said voltage generating means and maintained deactivated during voltage generation, a timing means connected to said amplifier for time out operation in response to activation of said amplifier, and drive means connected to said timing means for control energization at the end of said time out operation, said drive means also being selectively connected to said gear member by the operation of said timing means, said voltage generating means comprising an inductor positioned adjacent to said gear member, said inductor comprising a permanent magnet and a pair of pickup coils.

4. A rotating member zero speed indicator and drive control comprising a gear member connected to rotate with said rotating member, a voltage generating means adjacent to and inductively cooperating with the teeth of said gear member for generating an alternating voltage according to rotation of said rotating member, an amplifier connected to said voltage generating means and maintained deactivated during voltage generation, a timing means connected to said amplifier for time out operation in response to activation of said amplifier, drive means connected to said timing means for control energization at the end of said time out operation, said drive means also being selectively connected to said gear member by the operation of said timing means, said voltage generating means comprising an inductor positioned adjacent to said gear member, said inductor comprising a permanent magnet and a pair of pickup coils, and safety means for connecting said pickup coils in parallel to said amplifier, said safety means comprising a relay having a pair of opposing windings, said opposing windings being connected to said pickup coils and to a common amplifier input so that equal current flow through said opposing relay coils will energize said amplifiers without activating said relay.

5. A rotating member zero speed indicator and drive control comprising a gear member connected to rotate with said rotating member, a voltage generating means adjacent to and inductively cooperating with the teeth of said gear member for generating an alternating voltage according to rotation of said rotating member, an amplifier connected to said voltage generating means and maintained deactivated during voltage generation, a timing means connected to said amplifier for time out operation in response to activation of said amplifier, drive means connected to said timing means for control energization at the end of said time out operation, said drive means also being selectively connected to said gear member by the operation of said timing means, said voltage generating means comprising an inductor positioned adjacent to said gear member, said inductor comprising a permanent magnet and a pair of pickup coils, safety means for connecting said pickup coils in parallel to said amplifier, said safety means comprising a relay having a pair of opposing windings, said opposing windings being connected to said pickup coils and to a common amplifier input so that equal current flow through said opposing relay coils will energize said amplifier without actuating said relay, and rectifier and filter means connected between said coils and said windings to provide direct current amplifier control and a safe maximum coil output voltage at high rotating member speed.

6. A rotating member zero speed indicator and drive control comprising a gear member connected to rotate with said rotating member, a voltage generating means adjacent to and inductively cooperating with the teeth of said gear member for generating an alternating voltage according to rotation of said rotating member, an amplifier connected to said voltage generating means and maintained deactivated during voltage generation, a timing means connected to said amplifier for time out operation in response to activation of said amplifier, drive means connected to said timing means for control energization at the end of said time out operation, said drive means also being selectively connected to said gear member by the operation of said timing means, said voltage generating means comprising an inductor positioned adjacent to said gear member, said inductor comprising a permanent magnet and a pair of pickup coils, and safety means for connecting said pickup coils in parallel to said amplifier, said safety means comprising a relay having a pair of opposing windings, said opposing windings being connected to said pickup coils and to a common amplifier input so that equal current flow through said opposing relay coils will energize said amplifier without actuating said relay, said relay having first contacts connected to said amplifier to deactivate said amplifier upon relay operation.

7. A rotating member zero speed indicator and drive control comprising a gear member connected to rotate with said rotating member, a voltage generating means adjacent to and inductively cooperating with the teeth of said gear member for generating an alternating rotary-speed-indicative voltage, an amplifier connected to said voltage generating means and maintained deactivated during voltage generation, a timing means connected to said amplifier for time out operation in response to activation of said amplifier, and drive means connected to said timing means for control energization at the end of said time out operation, said drive means also being selectively connected to said gear member by the operation of said timing means, said amplifier being a magnetic amplifier positively biased for conduction and negatively biased to deactivation by said rotary-speed-indicative voltage.

8. A rotating member zero speed indicator and drive control comprising a gear member connected to rotate with said rotating member, a voltage generating means adjacent to and inductively cooperating with the teeth of said gear member for generating an alternating voltage according to rotation of said rotating member, an amplifier connected to said voltage generating means and maintained deactivated during voltage generation, a timing means connected to said amplifier for time out operation in response to activation of said amplifier, and drive means connected to said timing means for control energization at the end of said time out operation, said drive means also being selectively connected to said gear member by the operation of said timing means, said drive means comprising a synchronous motor and a driving gear, actuation means connecting said timing means to said driving gear, said driving gear being movable into engagement with said rotating member in response to activation of said timing means.

9. A rotating member zero speed indicator and drive control comprising a gear member connected to rotate with said rotating member, a voltage generating means adjacent to and inductively cooperating with the teeth of said gear member for generating an alternating voltage according to rotation of said rotating member, an amplifier connected to said voltage generating means and maintained deactivated during voltage generation, a timing means connected to said amplifier for time out operation in response to activation of said amplifier, drive means connected to said timing means for control energization at the end of said time out operation, said drive means also being selectively connected to said gear member by the operation of said timing means, said voltage generating means comprising an inductor positioned adjacent to said gear member, said inductor comprising a permanent magnet and a pair of pickup coils, safety means for connecting said pickup coils in parallel to said amplifier, said safety means comprising a relay having a pair of opposing windings, said opposing windings being connected to said pickup coils and to a common amplifier input so that equal current flow through said opposing relay coils will energize said amplifier without activating said relay, said relay having first contacts connected to said amplifier to deactivate said amplifier upon relay operation, second relay contacts, and warning means energized by closure of said second relay contacts upon energization of said relay.

10. In a system for automatically effecting turning of a turbine shaft by an auxiliary drive motor through the medium of a turbine-shaft-connected driving gear upon cessation of turbine operation, the combination of an inductive voltage generator means for disposition in proximity to the teeth of said driving gear to generate a turbine-speed-responsive voltage during rotation of the turbine shaft, and means, including a magnetic amplifier controlled by said turbine-speed-responsive voltage and biased for non-conduction while such control voltage exists, for effecting operation of the auxiliary drive motor upon stopping of the turbine shaft immediately following turbine operation.

11. In combination, a turbine shaft, a turbine-shaft-connected driving gear through the medium of which said turbine shaft is turned upon cessation of turbine operation, a drive motor operable to turn said driving gear, inductive voltage generator means disposed in proximity to the teeth of said driving gear to generate a turbine-speed-responsive voltage during rotation of the turbine shaft, and means controlled by said turbine-speed-responsive voltage for effectuating said drive motor upon stopping of the turbine shaft following turbine operation.

References Cited in the file of this patent

UNITED STATES PATENTS

| | | |
|---|---|---|
| 832,072 | Lyndon | Oct. 2, 1906 |
| 1,285,625 | Cline | Nov. 26, 1918 |
| 1,670,985 | Porter | May 22, 1928 |
| 2,282,933 | Cahill | May 12, 1942 |
| 2,617,253 | Fusner | Nov. 11, 1952 |
| 2,807,014 | Rickert | Sept. 17, 1957 |
| 2,823,320 | Larsson | Feb. 11, 1958 |